United States Patent [19]

Scholz

[11] 4,261,235

[45] Apr. 14, 1981

[54] CUTTER HEAD FOR TRACED PRETURNING OF RODS, PIPES AND WIRES

[75] Inventor: Klaus Scholz, Solingen, Fed. Rep. of Germany

[73] Assignee: Th. Kieserling & Albrecht, Solingen, Fed. Rep. of Germany

[21] Appl. No.: 80,785

[22] Filed: Oct. 1, 1979

[30] Foreign Application Priority Data

Sep. 29, 1978 [DE] Fed. Rep. of Germany ....... 2842436

[51] Int. Cl.³ .......................... B23B 5/00; B23B 3/28; B23B 3/00
[52] U.S. Cl. ........................................ 82/20; 82/2 E; 82/19
[58] Field of Search ............................. 82/19, 20, 2 E

[56] References Cited

U.S. PATENT DOCUMENTS

| 3,788,170 | 1/1974 | Riedel | 82/20 |
| 3,842,697 | 10/1974 | Striegl | 82/2 E |
| 4,061,078 | 12/1977 | Lifshits | 82/2 E |

FOREIGN PATENT DOCUMENTS

| 111296 | 6/1963 | Czechoslovakia | 82/20 |
| 894485 | 4/1962 | United Kingdom | 82/20 |

Primary Examiner—Harrison L. Hinson
Attorney, Agent, or Firm—Michael J. Striker

[57] ABSTRACT

The cutter head for the traced rough turning of rod-like workpieces includes a rotary base ring provided with a plurality of radial guideways. A supporting member in the form of a slide carriage movable on the radial guideways supports an elongated blade holder which is pivotable about a hinge point laterally offset from the guideways. The free end of each blade holder carries an inserted blade and is spring biased against the workpiece at the center of the base ring by a set of biasing springs supported on the slide carriage. A tracer pin adjoins the cutting blade and its vertical position is adjustable relative to the main cutting edge to determine the thickness of the cuttings. The point of contact of the cutting edge relative to the center of the hinge joint forms with a tangent line passing through the contact point an angle between 10° to 25°.

5 Claims, 3 Drawing Figures

U.S. Patent
Apr. 14, 1981
4,261,235
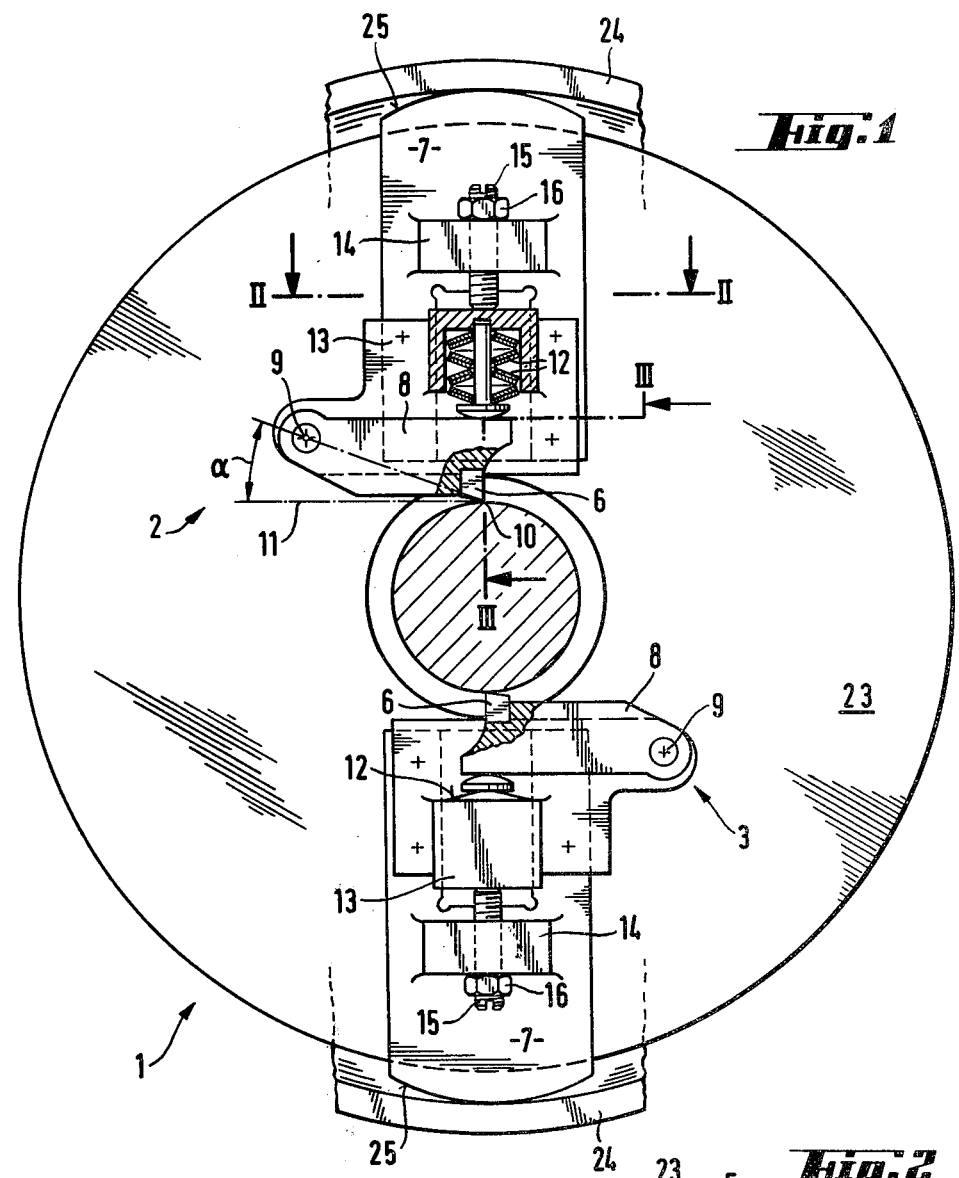
Fig. 1
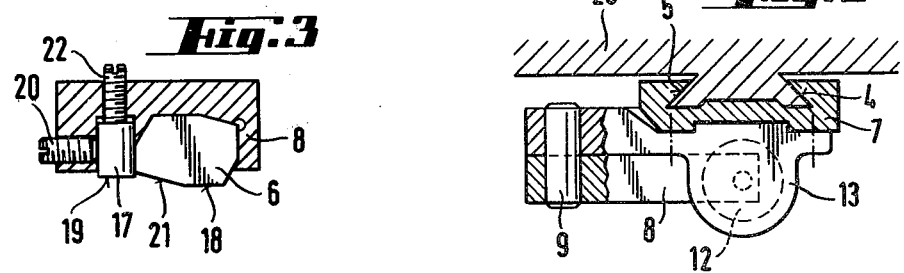
Fig. 3
Fig. 2

CUTTER HEAD FOR TRACED PRETURNING OF RODS, PIPES AND WIRES

BACKGROUND OF THE INVENTION

This invention relates generally to an inserted blade rotary cutter for the traced rough turning of rods, pipes and the like workpieces; the cutter being of the type which has a rotary base plate with a plurality of sliders arranged thereon for movement in the radial direction and each supporting on its end facing the center of the plate a blade holder.

In the traced preturning of rods, tubes and the like, it is desirable to remove only the marginal decarbonized layer and the scales and not—as it is otherwise usual in the preturning operation,—also to improve the concentricity and uniformity of the diameter of the workpiece under the preturning process. In addition, it is required to operate at as low cutting losses as possible. At the same time, the entire jacket surface of the workpiece has to be flawlessly milled off. The above requirements are attained by reducing the diameter of the processed workpiece by removing an outer layer which has a constant thickness. In the case when a workpiece having an oval cross section is being processed, the cutting blade during each revolution of the head performs a back-and-forth movement in radial direction.

From the British specification No. 1,479,872 a cutter head for the traced rough turning is known in which the blade holders are guided by sliders supported for movement in radial guideways in order to follow a non-circular contour of the processed workpiece. Since in this known design the blade holder has to be radially displaced under the cutting pressure excessive frictional forces result and these forces have to be overcome by springs arranged between the sliders and the assigned blade holder. The forces employed for displacing the blade holder in the slider act also partially against tracing means which roll on the periphery of the processed workpiece and consequently excessive wear of this tracing means takes place. In this known design the blades together with the blade holders can follow the contour of the workpieces only with difficulties and this fact especially at high rotational speeds of the cutter head is disadvantageous.

SUMMARY OF THE INVENTION

It is therefore the primary object of the present invention to overcome the aforementioned disadvantages.

More particularly, it is an object of this invention to provide a cutter head of the aforedescribed type in which the blade holders can easily follow the contour of the process workpiece.

Another object of this invention is to substantially reduce frictional forces between the slider and the blade holder.

A further object of this invention is to provide such an improved cutter head which requires a substantially reduced pressing force exerted by the slider against the blade holder.

An additional object of this invention is to substantially reduce the wear of tracing means.

In keeping with these objects, and others which will become apparent hereafter, one feature of the invention resides, in a rotary cutter head of the above-described type, in a combination which comprises an elongated blade holder hinged at one end thereof to the assigned slider and holding at its free end a blade, spring means arranged between the slider and the free end of the blade holder to urge the blade against the workpiece and a tracing member arranged on the blade holder immediately before the cutting edge of the blade. Preferably, the hinge joint of each blade holder is arranged behind the cutting edge of the blade when viewed in the direction of rotation of the head. In this manner it is achieved that the area for discharging the cuttings is not obstructed by the hinge mount.

In another preferred embodiment of this invention, the connection line between the hinge joint of the blade holder and the cutting point of the blade forms with a tangent line at the cutting point an angle of between 10° and 25°. In this manner the spring force necessary for compression of the blade holder against the workpiece is considerably reduced in comparison with the prior art devices and the wear of the tracing member is reduced to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a front view of the rotary cutting head of this invention;

FIG. 2 is a sectional side view taken along the line II—II of FIG. 1; and

FIG. 3 is an enlarged sectional side view taken on the line III—III of FIG. 1.

DESCRIPTION OF THE PREFERRED EMBODIMENTS

FIG. 1 shows a rotary cutting head 1 including two cutter units 2 and 3 slidably mounted on a rotary base ring or plate 23. In this example, both cutter units 2 and 3 diametrically face each other and are of the same design. Each cutter unit is slidably supported for movement in radial direction in two guideways 4 and 5 formed in the base plate 23. Accordingly, when the two cutter units 2 and 3 are moved opposite each other, cutting blades 6 are moved toward the workpiece located at the center opening of the plate. Each cutter unit is assembled of a lower slide carriage 7, an upper slide carriage 13 supported for movement in radial direction on the lower slide carriage 7, and of an elongated blade holder 8 which at one end thereof supports the cutting blade 6 and at the other end is pivotably linked to the upper slide carriage 13 by a hinge joint 9. The hinge joint is offset laterally from the guideways 4 and 5. The position of the hinge joint 9 relative to the cutting edge of blade 6 is selected such that a connection line passing through the center of the hinge joint 9 and the contact point 10 of the cutting edge of the blade 6 with the workpiece, forms with the tangent line passing through the contact point 10 an angle α between 10° to 25°. The position of respective lines forming the angle α corresponds to the resulting vector lines of the applied cutting force.

The free end of the blade holder 8 with blade 6 is biased by a set of pressure springs 12 arranged on the upper slider 13. The adjustment of the biasing force of springs 12 is made by adjusting the position of the upper slider 13 by an adjustment screw 15. The screw 15 engages a threaded hole in a bracket 14 on the lower carriage 7. By turning the adjustment screw 15 it is possible to adjust the position of the corresponding cutting blade 6 relative to the workpiece. A lock nut 16 arrests the adjustment screw 15 in its adjusted position.

In the preferred embodiment of the invention, the rotary cutter head 1 is adapted for tracing the contour of the processed workpiece during the preturning operation. For this purpose a tracer pin or feeler 17 is mounted on the blade holder 8 in proximity to the cutting edge of the blade 6, as indicated in FIG. 3. The feeler 17 joins the lateral side of the cutting blade 6 and traces the upper surface of the processed workpiece. The contact surface 19 of the feeler 17 is recessed with respect to the side cutting edge 18 of the blade 6 about the thickness of the layer to be removed. The feeler 17 is locked in the blade holder together with the cutting blade 6 by means of a locking screw 20. In the locking position, the feeler 17, as mentioned above, adjoins a lateral side of the blade 6 immediately behind the main cutting edge 21 of the blade 6. By adjusting the vertical position of the feeler 17 by means of a setting screw 22 the desired depth of cutting is adjusted. During this vertical adjustment the locking screw 20 is released.

Due to the resilient bias exerted by the spring set 12 between the base plate 23 and the pivotable blade holder 8 and due to the adjustment of the tracer feeler 17 it is attained that a layer of material having a uniform thickness is removed from the workpiece. The eccentricities of the surface of the workpiece are followed exclusively by the hinged blade holder 8 whereas the slider 7 remains stationary on its guideways 4 and 5. The radial adjustment of the position of sliders 7 is made only in the case when the cutter head 1 is readjusted to a different diameter of a new workpiece. The fine adjustment, as mentioned above, is effected by the adjustment screw 15. In this manner the cutting geometry remains unchanged even if the blades are adjusted for a different diameter of the workpiece. Due to the elongated configuration of the blade holder 8 which is made as long as possible in the limits of the cutter head, the horizontal swing of the cutting blade 6 is relatively small. Respective lower slide carriages 7 bear with their outer ends against the conical inner surface of a tapering sleeve 24 rotating together with the base plate 23. The outer end portions of the lower slider 7 form conical sections 25 which abut against the inner wall of the tapering sleeve 24. To adjust the radial position of the respective blade units 2 and 3 relative to the center of the cutter head, when a new workpiece of a different diameter is to be processed, the tapering sleeve 24 is displaced in axial direction relative to the conical sections 25.

It will be understood that each of the elements described above, or two or more together, may also find a useful application in other types of constructions differing from the types described above.

While the invention has been illustrated and described as embodied in a specific example of the cutter head, it is not intended to be limited to the details shown, since various modifications and structural changes may be made without departing in any way from the spirit of the present invention. For example, a plurality of blade units can be arranged on the base plate in a star-like pattern.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rotary cutter head for traced preturning of tubes, rods and the like workpieces, comprising; a rotary base plate; a support member arranged on said plate for sliding movement in radial direction; an elongated blade holder hinged at one end thereof on said support member and holding at its free end a cutting blade; spring means arranged between said support member and said free end of said blade holder to urge the latter against the workpiece; and a tracing member arranged on said blade holder in the range of said cutting blade.

2. The rotary cutter head as defined in claim 1 wherein said rotary base plate includes radial guideways, said support member including a lower slide carriage guided in said guideways and an upper slide carriage guided in radial direction on said lower slide carriage, said blade holder being hinged to said upper slide carriage and said spring means being arranged between said lower slide carriage and said blade holder.

3. A rotary cutter head as defined in claim 2 wherein said blade holder is hinged on said support member at a point which is laterally offset relative to said guideways.

4. The rotary cutter head as defined in claim 1 wherein said blade holder is hinged to said support member at a hinge joint which is laterally offset from the path of movement of said support members and is located behind the contact point of the cutting edge of said blade with the workpiece when viewed in the direction of rotation of the head.

5. The rotary cutter head as defined in claim 4 wherein a connection line between the hinge joint of the blade holder and the contact point of the cutting blade with the workpiece forms with a tangent line passing through said contact point an angle between 10° and 25°.

* * * * *